(12) United States Patent
Wang

(10) Patent No.: US 10,472,182 B2
(45) Date of Patent: Nov. 12, 2019

(54) POSITIONING APPARATUS AND CONVEYOR MECHANISM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Hao Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/783,914

(22) Filed: Oct. 13, 2017

(65) Prior Publication Data

US 2018/0265306 A1 Sep. 20, 2018

(30) Foreign Application Priority Data

Mar. 14, 2017 (CN) .................... 2017 2 0252703 U

(51) Int. Cl.
*B65G 47/49* (2006.01)
*G06K 7/14* (2006.01)
*B65G 1/04* (2006.01)
*B65G 35/06* (2006.01)

(52) U.S. Cl.
CPC ............ *B65G 47/493* (2013.01); *B65G 1/04* (2013.01); *B65G 47/49* (2013.01); *G06K 7/1413* (2013.01); *G06K 7/1417* (2013.01); *B65G 35/06* (2013.01); *B65G 2203/0283* (2013.01); *B65G 2203/044* (2013.01)

(58) Field of Classification Search
CPC ...................................... B65G 47/493
USPC ........................... 235/462.1; 438/57
See application file for complete search history.

(56) References Cited

U.S. PATENT DOCUMENTS

| | | | | |
|---|---|---|---|---|
| 2004/0234360 | A1* | 11/2004 | Hayashi | H01L 21/67778 414/217 |
| 2011/0074458 | A1* | 3/2011 | Di Stefano | G01R 1/0466 324/757.01 |
| 2013/0052768 | A1* | 2/2013 | Gee | B23K 26/0838 438/57 |
| 2013/0314531 | A1* | 11/2013 | Abe | G06T 7/0004 348/126 |

(Continued)

*Primary Examiner* — Allyson N Trail
(74) *Attorney, Agent, or Firm* — Womble Bond Dickinson (US) LLP

(57) ABSTRACT

The present disclosure discloses a positioning apparatus, including an identification code reading assembly which comprises a support part and an identification code reader mounted on the support part, wherein the support part is connected with a running part of a conveyor mechanism; and further comprising a shield, in which at least a portion of the support part is located and out of which the identification code reader is located. The present disclosure also discloses a conveyor mechanism. The shield provided by the positioning apparatus according to the present disclosure may function to protect the identification code reader without affecting the normal reading operation of the identification code reader, thereby ensuring the accuracy of the positioning of the conveyor mechanism conducted by the positioning apparatus.

15 Claims, 3 Drawing Sheets

(56) References Cited

U.S. PATENT DOCUMENTS

2015/0357211 A1\* 12/2015 Usami ................ H01L 21/6773
                                                                                               212/330

\* cited by examiner

POSITIONING APPARATUS AND CONVEYOR MECHANISM

RELATED APPLICATIONS

This application claims the priority of Chinese Patent Application No. 201720252703.2 filed on Mar. 14, 2017, the entire disclosure of which is incorporated herein by reference.

TECHNICAL FIELD

The present disclosure relates to the field of equipment manufacturing, and particularly to a positioning apparatus and a conveyor mechanism including the positioning apparatus.

BACKGROUND

In the field of thin film transistor liquid crystal display, usually, a trolley is required to transport substrates or the like from one position to another. To make the position of the transportation accurate, one or more identification codes recording positional information are provided on the track along which the trolley moves. On the trolley is provided an identification code reader. The positioning of the trolley may be achieved by reading the positional information recorded in the identification code using the identification code reader. If the position of the identification code reader is shifted due to any external force or the like, the positional information read by the identification code reader may be inaccurate, resulting in an inaccurate positioning of the trolley. Thus, the position of the identification code reader itself can affect the accuracy of the positioning of the trolley.

SUMMARY

In the prior art, the protective measures for the identification code reader are not strong enough, even some code readers are not provided with any protective apparatus, and there is no corresponding detecting apparatus in the prior art trolley systems to determine whether the identification code reader is shifted.

Therefore, a technical problem to be solved urgently is to prevent the identification code reader on the trolley from being shifted.

The present disclosure can solve at least one of the technical problems existing in the prior art by providing a positioning apparatus and a conveyor mechanism including the positioning apparatus.

To achieve this, according to a first aspect of the present disclosure, there is provided a positioning apparatus, comprising: an identification code reading assembly which comprises a support part and an identification code reader mounted on the support part, wherein the support part is connected with a running part of a conveyor mechanism; and a shield, in which at least a portion of the support part is located and out of which the identification code reader is located.

In an embodiment, the shield comprises at least one side wall and a top wall, which jointly form a shield chamber with an opening, wherein the at least a portion of the support part is located in the shield chamber and the identification code reader is located out of the shield chamber.

In an embodiment, the at least one side wall comprises a first side wall, a second side wall and a third side wall, wherein the first side wall and the second side wall are substantially opposite to each other and the third side wall is connected with the first side wall and the second side wall, and the first side wall, the second side wall and the third side wall together with the top wall jointly enclose the shield chamber.

In an embodiment, the shield further comprises a mounting bracket which comprises a mounting part and a connecting part connected with the mounting part, wherein the shield is provided on the connecting part, and the shield and the identification code reader are located on the same side of the mounting part.

According to a second aspect of the present disclosure, there is provided a conveyor mechanism comprising: a running part, a carrying part provided on the running part for carrying materials, and the positioning apparatus as disclosed above that is provided on the running part.

In an embodiment, the conveyor mechanism further comprises at least one limit switch controller provided on the running part, wherein the limit switch controller is located beside the side of the identification code reader and separated from the identification code reader by a limit distance, and wherein the limit switch controller will stop the running part from running when the identification code reader is shifted and consequently touches the limit switch controller.

In an embodiment, the conveyor mechanism comprises two limit switch controllers which are provided on the runner part and located at both sides of the identification code reader respectively.

In an embodiment, the conveyor mechanism comprises a securing member which is connected with the limit switch controller, wherein the limit switch controller is connectable with the conveyor mechanism by means of a connection between the securing member and a securing hole provided on the running part.

In an embodiment, the shield comprises a mounting bracket and a first mounting hole is provided on the running part, and a mounting part of the mounting bracket is connected with the running part through the first mounting hole.

In an embodiment, a second mounting hole is provided on the running part and the support part is connected with the running part through the second mounting hole.

The positioning apparatus according to the present disclosure provides a shield for the identification code reading assembly such that at least a portion of the support part of the identification code reading assembly is located in the shield and the identification code reader is located outside the shield. This way, the positioning apparatus is able to scan the identification code by the identification code reader. Moreover, the shield can cover the identification code reader without affecting the normal use of the identification code reader. Specifically, when the positioning apparatus is mounted on the conveyor mechanism, the shield and the identification code reading assembly are separately connected to the conveyor mechanism, i.e. the shield and the identification code reading assembly do not connect with each other. Thus, when there is any external force, such as stampede or collision etc., the shield bear the external force for the identification code reading assembly, which protecting the identification code reader without affecting the normal reading operations of the identification code reader, therefore ensuring the accuracy of the positioning of the conveyor mechanism conducted by the positioning apparatus.

BRIEF DESCRIPTION OF THE DRAWINGS

The accompanying drawings provide a further understanding of the present disclosure and constitute a part of the specification. The drawings are intended to help explain this disclosure with the following detailed description together, and should not be construed as limiting the disclosure. In the drawings.

In the drawings, the same reference numerals denote the same or similar elements.

DETAILED DESCRIPTION

Embodiments of the present disclosure will be described below in detail with reference to the accompanying drawings. It is to be understood that the embodiments described herein are only for the purpose of illustration and explanation, and are not intended to limit the present disclosure.

Figure 1:
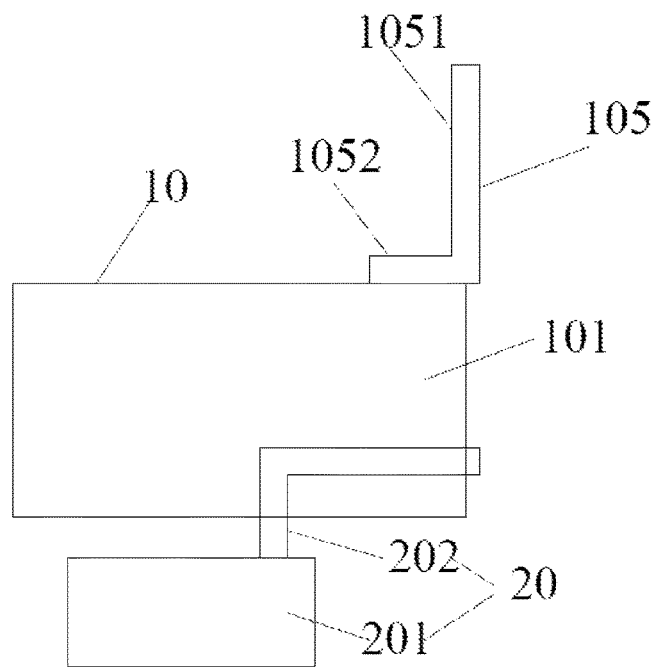
FIG. 1 is a schematic right view of an exemplary structure of a positioning apparatus according to the present disclosure.

A first aspect of the present disclosure provides a positioning apparatus. As shown in FIG. 1, the positioning apparatus comprises an identification code reading module 20 which comprises a support part 202 and an identification code reader 201 mounted on the support part 202. The support part 202 is to be connected with a running part of a conveyor mechanism. The positioning apparatus further comprises a shield 10 in which at least a portion of the support part 202 is located, and out of which the identification code reader 201 is located.

The positioning apparatus according to the present disclosure provides a shield for the identification code reading assembly, such that a portion of the identification code reading assembly is located in the shield and the identification code reader is located outside the shield. In this way, the positioning apparatus reads (such as by scanning or photographing) the identification code through the identification code reader. The shield can cover the identification code reader without affecting the normal use of the identification code reader. When the positioning apparatus is mounted on the conveyor mechanism, the shield and the identification code reading assembly are separately connected to the conveyor mechanism, i.e. the shield and the identification code reading assembly do not connect with each other. Thus, when there is any external force, such as stampede or collision etc., the external force will be applied to and blocked by the shield, such that the identification code reader would not be affected by the external force. It prevents the identification code reader from falling off the conveyor mechanism or changing in position due to the external force, therefore ensuring the accuracy of the positioning of the conveyor mechanism conducted by the positioning apparatus.

Specifically, as can be seen from FIG. 1, the identification code reading assembly 20 includes a support part 202 and an identification code reader 201. To facilitate the scanning of the identification code, the identification code reader 201 is located outside the shield 10, and to protect the identification code reader 201, at least a portion of the support part 202 is located in the shield 10. Taking the orientations shown in FIG. 1 as an example, the shield 10 is located directly above the identification code reader 201. In this way, in the case of an external obstacle, the collision or impact caused by the external obstacle is applied to and blocked by the shield 10 and therefore will not hit the identification code reading assembly 20, especially the identification code reader 210, protected by the shield 10, thereby preventing the identification code reader 201 from falling off the conveyor mechanism or changing in position due to the collision or impact of the obstacle, and thus ensuring the accuracy of the positioning of the conveyor mechanism by the identification code reader 201.

In an embodiment, the support part 202 may be an L-shaped bracket. One branch of the L-shaped bracket (i.e., the vertical branch in FIG. 1) is connected with the identification code reader 201, and the other branch of the L-shaped bracket (i.e., the lateral branch in FIG. 1) is used for securing to the running part of the conveyor mechanism.

It will be understood that the identification code scanned by the identification code reader 201 includes bar codes, two-dimensional codes, and so on. The identification code records positional information. When the identification code reader 201 scans the identification code, it is able to transmit the positional information to a controller connected with the identification code reader 201. The transmission may be wired or wireless. In an embodiment, the identification code reading assembly 20 is mounted on a trolley for transporting materials. In that case, it is possible to record the travel distance of the trolley by having the identification code reader 201 scanning the identification code alongside the trolley track, thereby positioning the trolley.

Figure 2:
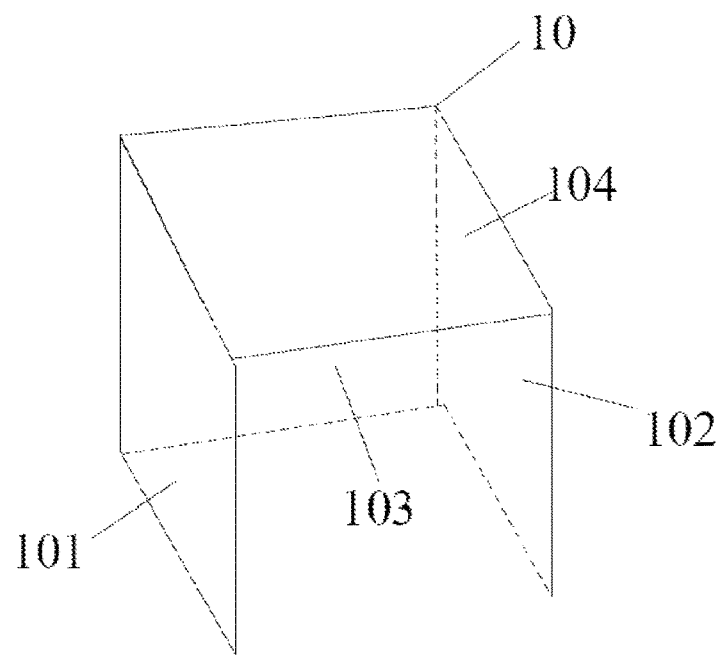
FIG. 2 is a schematic diagram of an exemplary structure of a shield according to the present disclosure.

In order to achieve the protection of the identification code reader 201, the shield 10 may have a variety of implementations. Taking the orientations shown in FIG. 1 as example, the lower surface of the identification code reader 201 is closer to the ground and thus is less likely to be affected by an external force. As a result, this lower surface may not need protection. The surface of the identification code reader 201 that faces the identification code is used to scan the identification code and thus the shield of this surface cannot extend to block the identification code reader. The surface of the identification code reader 201 that faces the trolley is relatively close to the trolley and thus is also less likely to be affected by the external force, so this surface may also not need shield. To sum up, it is required that the top surface, the front surface (i.e., the left side in FIG. 1), and the two side surfaces (i.e., the left and right sides in FIG. 3) of the identification code reader 201 should not be affected by external forces, and that the protection of the front surface of the identification code reader 201 should not block the reading operation of the identification code reader 201. Thus, as a specific embodiment of the shield 10, the shield 10 includes side walls located at the sides of the shield and a top wall located on the top surface of the shield, as shown in FIG. 2. The side walls and the top wall enclose a shield chamber having an opening. At least a portion of the support part 202 is located in the shield chamber and the identification code reader 201 is located outside the shield chamber.

With the shield structure described above, it is possible to protect the upper surface, the front surface, and the two side surfaces of the identification code reader 201 from being affected by the external forces, thus improving the accuracy of the positioning while ensuring the normal operation of the identification code reader 201. In an embodiment, the shield 10 may be arranged at a position about 3 cm above the identification code reader 201. That avoids the identification code reader's difficulty of reading data due to an overly small distance, as well as avoids the shield's failure of protecting the identification code reader 201 due to an overly large distance.

As a specific embodiment of the side walls of the shield 10, as shown in FIG. 2, the side walls include a first side wall 101, a second side wall 102 and a third side wall 103. The first side wall 101 and the second side wall 102 is arranged substantially opposite to each other, the third side wall 103 is connected with the first side wall 101 and the second side wall 102. The first side wall 101, the second side wall 102, the third side wall 103, and the top wall 104 jointly enclose the shield chamber. The meaning of the phrase "arranged substantially opposite to each other" includes, but is not limited to, that the two side walls are facing each other in parallel. For example, the two side walls may face each other at an angle.

Taking the orientations shown in FIG. 1 as an example, the first side wall 101 and the second side wall 102 are located at the front and rear sides of the identification code reader 201, respectively (to clarify said "front and rear", assuming an axis perpendicular to the plane where the figure is located, the direction of the axis facing away from the plane indicates the "front" and the direction facing into the plane indicates the "rear", and in FIG. 1, the front side is shown while the rear side is not due to being blocked), and the third side wall 103 is located at the left side of the identification code reader 201 shown in FIG. 1, i.e., the same side as the surface performs scanning.

It will be understood that the side walls may also include other structures. For example, the side walls may further include a fourth side wall arranged opposite to the third side wall. A through-hole may be provided on the fourth side wall, through which the support part 202 is fixed to the running part of the conveyor mechanism.

Figure 4:
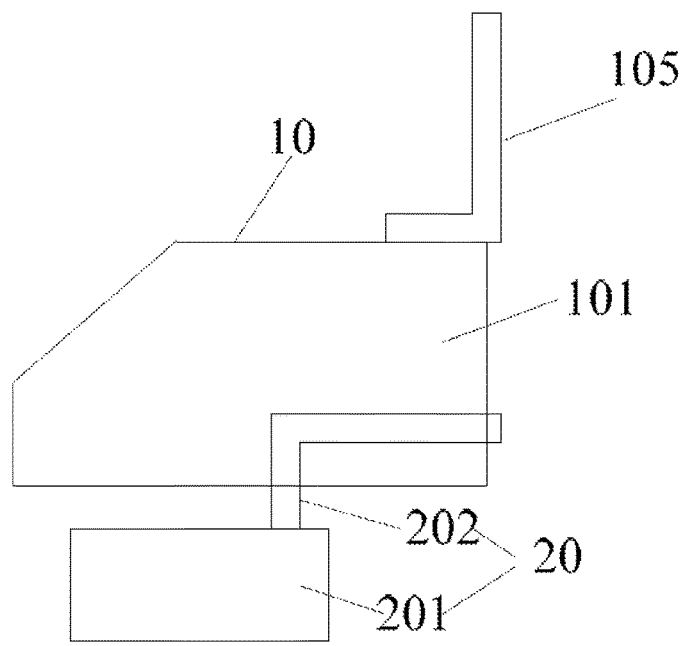
FIG. 4 is a schematic right view of another exemplary structure of the positioning apparatus according to the present disclosure.

In an embodiment, in order to save the space above the shield 10, a portion of the top wall of the shield is slanted, as shown in FIG. 4. This may protect the identification code reader 201 while saving the space above the shield 10.

Figure 3:
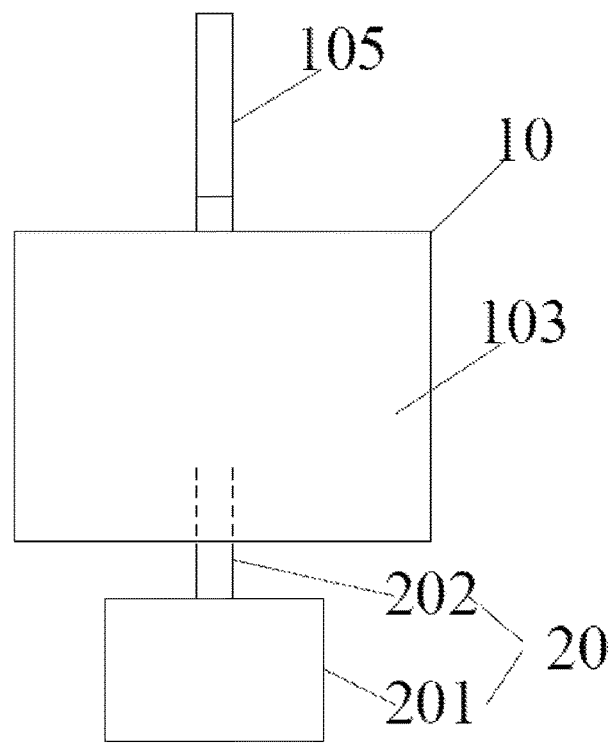
FIG. 3 is a schematic front view of the exemplary structure of the positioning apparatus according to the present disclosure.

In order to fix the shield 10 to the conveyor mechanism, the shield 10 further includes a mounting bracket 105, as shown in FIGS. 1, 3 and 4. The mounting bracket 105 includes a mounting part 1051 and a connecting part 1052 connected with the mounting part 1051. The shield 10 arranged on the connecting part 1052 and the identification code reader 201 located outside the shield 10 are both located at the same side of the mounting part 1051.

Specifically, taking the structure shown in FIG. 1 as an example, the connecting part 1052 of the mounting bracket 105 is provided on the top wall 104 of the shield 10. The mounting part 1051 is used to be fixed to the running part (not shown in FIG. 1) of the conveyor mechanism to secure the shield 10 connected with the connecting part 1052.

Preferably, the mounting bracket 105 is an L-shaped bracket. Taking the structure shown in FIG. 1 as an example, the lateral branch of the L-shaped bracket is the connecting part 1052, and the vertical branch of the L-shaped bracket is the mounting part 1051. It will be understood that since the mounting part 1051 needs to be mounted on the running part of the conveyor mechanism, the shield 10 and the identification code reader 201 are both located on the same side of the mounting part 1051 in order to facilitate the installation of the shield 10.

The positioning apparatus according to the present disclosure provides a shield for the identification code reading assembly. When an external force exists, the external force is applied to the shield and will not affect the identification code reader since the shield and the identification code reader are individually fixed to the conveyor mechanism (i.e., there is no connection between the shield and the identification code reader). Thus, the shield is capable of protecting the identification code reader, such that the positioning of the conveyor mechanism by the positioning apparatus is accurate.

Figure 5:
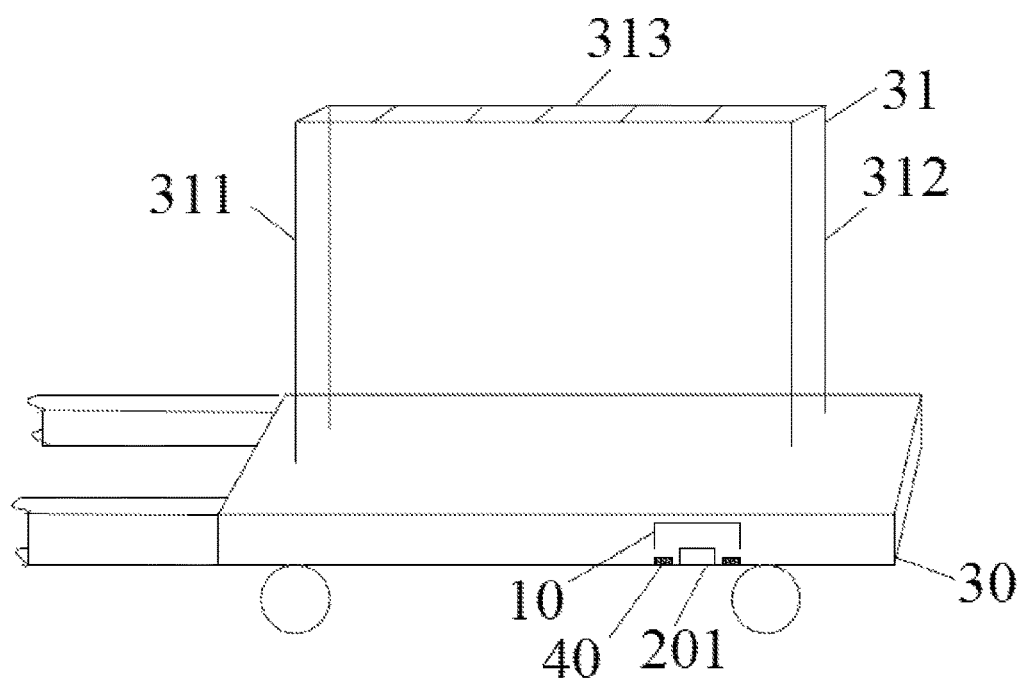
FIG. 5 is a schematic diagram of an exemplary structure of a conveyor mechanism according to the present disclosure.

As a second aspect of the present disclosure, there is provided a conveyor mechanism. As shown in FIG. 5, the conveyor mechanism includes a running part 30, a carrying part 31 provided on the running part 30 for carrying materials, and a positioning apparatus as described above that is arranged on the running part 30.

The conveyor mechanism according to the present disclosure employs the positioning apparatus described above. When the conveyor mechanism travels on the conveyor track, the positioning of the conveyor mechanism can be achieved by having the identification code reader on the positioning apparatus reading the position identification code alongside the track, and since the shield that functions to protect the identification code reader is provided in the positioning apparatus, when there is any external force, such as stampede or collision, the external force will be applied to and blocked by the shield. The shield functions to protect the identification code reader such that the identification code reader will not affected by the external force and will not change in position or the like, thereby ensuring the accuracy of positioning of the conveyor mechanism by the positioning apparatus.

Specifically, the conveyor mechanism is used to convey materials. The conveyor mechanism includes a carrying part 31, which can be used for carrying materials, such as substrates etc. Since the substrate needs to be conveyed to a fixed position for the operation of the production line, it is needed to position the conveying process of the conveyor mechanism. The identification codes carrying the positional information are provided, along the traveling direction of the conveyor mechanism, on both sides of the conveyor track of the conveyor mechanism. Real-time positional information is acquired by causing the identification code reader 201 mounted on the running part 30 of the conveyor mechanism to scan the identification codes. The acquired real-time positional information is then uploaded to a controller, with which the controller controls the conveyor mechanism to stop.

To further protect the identification code reader from being affected by external forces to improve the positioning accuracy, as shown in FIG. 5, the conveyor mechanism further includes at least one limit switch controller provided on the running part 30. The limit switch controller(s) is(are) located at a side (or sides) of the identification code reader that is(are) adjacent to the first side wall 101 and/or the second side wall 102, and the limit switch controller(s) is(are) spaced from the identification code reader by a limit distance. The limit switch controller is capable of controlling the running part to stop running, when the identification code reader is moved to touch the limit switch controller.

Specifically, by providing the limit switch controller on at least one side of the identification code reader, the identification code reader may trigger the limit switch controller located at the at least one side thereof when it is shifted by an external force. After being triggered, the limit switch controller will send a signal to the controller to stop the operation of the conveyor mechanism. This avoids an error in the positioning of the conveyor mechanism.

In general, the limit distance is related to the desired positioning precision. The limit distance in the present disclosure is within 2 mm, which can satisfy the positioning precision of the conveyor mechanism.

In an embodiment, the conveyor mechanism includes two limit switch controllers provided on the running part 30, and the two limit switch controllers are located on two sides of the identification code reader, respectively. Taking the structure shown in FIG. 5 as an example, each of the left and right sides (i.e., the front and rear sides in FIG. 1) of the identification code reader is provided with a respective limit switch. This way, it is guaranteed that the operation of the conveyor mechanism can be stopped regardless of the direction that the identification code reader is shifted to (the left or the right), thereby enabling the correction of the position of the identification code read reader, to improve the positioning accuracy of the identification code reader and to avoid erroneous positioning of the conveyor mechanism.

For the installation of the limit switch controller, the conveyor mechanism includes a securing member (not shown in the figure) that is connected with the running part 30. An implementation of the connection is to provide a securing hole (not shown in the figure) on the running part 30, through which the securing member is connected with the running part 30.

Specifically, the securing member may be a screw to which the limit switch controller is secured, and the securing hole on the running part 30 may be a threaded hole. The limit switch controller is connectable to the running part 30 by inserting the screw into the threaded hole. The connection may be implemented in other ways, such as by gluing, welding, or other fastening schemes.

To secure the shield, the shield includes the mounting bracket described above. In an embodiment, the running part 30 is provided with a first mounting hole (not shown in the figure) through which the mounting part of the mounting bracket is connected to the running part 30.

Specifically, in a particular embodiment, the first mounting hole may be a threaded hole, and the mounting part is provided with a through-hole, the mounting bracket is secured to the running part 30 by inserting the screw into the threaded hole through the through-hole.

To enable the securing of the identification code reading assembly, in an embodiment, the running part 30 is provided with a second mounting hole (not shown in the figure) through which the support part is connected to the running part 30.

Specifically, in an embodiment, the support part is the one as described above, i.e., one end of the support part is connected to the identification code reader, and a through-hole is arranged at the other end thereof. The second mounting hole is a threaded hole. The identification code reader is connected to the running part 30 by inserting the screw into the threaded hole through the through-hole.

As shown in FIG. 5, the specific structure of the carrying part 31 for carrying the materials may be as the following: the carrying part 31 includes a first elevating rack 311, a second elevating rack 312 and a carrying rack 313, with the first elevating rack 311 and the second elevating rack are arranged opposite to each other, and the bottom end of the first elevating rack 311 and the bottom end of the second elevating rack 312 are both secured to the running part 30, while the top end of the first elevating rack 311 and the top end of the second elevating rack 312 jointly support the carrying rack 313. The carrying rack 313 is used to carry the materials.

It is to be understood that the loading and unloading of the materials on the carrying rack 313 can be facilitated by arranging the carrying part 31 as having the first elevating rack 311 and the second elevating rack 312.

The conveyor mechanism according to the present disclosure improves the accuracy of positioning of the conveyor mechanism by employing the positioning apparatus as described above. Also, by providing the limit switch controller on the running part, it is possible to further protect the identification code reader, thereby further improving the accuracy of positioning of the conveyor mechanism.

It will be understood that the above embodiments are merely exemplary embodiments used for illustrating the principles of the present disclosure; however, the present disclosure is not limited thereto. Various variations and improvements can be made by those of the person having ordinary skill in the art without departing from the spirit and essence of the present disclosure. These variations and improvements are also considered as within the scope of the present disclosure.

LISTING OF THE REFERENCE NUMERALS

10: shield;
101: first side wall;
102: second side wall;
103: third side wall;
104: top wall;
105: mounting bracket;
1051: mounting part;
1052: connecting part;
20: identification code reading assembly;
201: identification code reader;
202: support part;
30: running part;
31: carrying part;
311: first elevating rack;
312: second elevating rack;
313: carrying rack;
40: limit switch controller.

What is claimed is:

1. A positioning apparatus, comprising
an identification code reading assembly which comprises a support part and an identification code reader mounted on the support part, wherein the support part is connected with a running part of a conveyor mechanism; and
a shield, in which at least a portion of the support part is located and out of which the identification code reader is located,
wherein the shield comprises at least one side wall and a top wall, which jointly form a shield chamber with an opening, wherein said at least a portion of the support part is located in the shield chamber and the identification code reader is located outside the shield chamber.

2. The positioning apparatus according to claim 1, wherein said at least one side wall comprises a first side wall, a second side wall and a third side wall, wherein the first side wall and the second side wall are substantially opposite to each other and the third side wall is connected with the first side wall and the second side wall, and the first side wall, the second side wall and the third side wall together with the top wall jointly enclose the shield chamber.

3. The positioning apparatus according to claim 1, wherein the shield further comprises a mounting bracket which comprises a mounting part and a connecting part connected with the mounting part, wherein the shield is provided on the connecting part, and the shield and the identification code reader are located on the same side of the mounting part.

4. A conveyor mechanism comprising:
a running part;
a carrying part provided on the running part for carrying materials; and
a positioning apparatus provided on the running part, wherein the positioning apparatus comprises:
an identification code reading assembly, comprising a support part and an identification code reader mounted on the support part, wherein the support part is connected with the running part of the conveyor mechanism, and
a shield, in which at least a portion of the support part is located and out of which the identification code reader is located.

5. The conveyor mechanism according to claim 4, further comprises at least one limit switch controller provided on the running part, wherein the limit switch controller is located beside the side of the identification code reader and separated from the identification code reader by a limit distance, and wherein the limit switch controller will stop the running part from running when the identification code reader is shifted and consequently touches the limit switch controller.

6. The conveyor mechanism according to claim 5, further comprises two limit switch controllers which are provided on the runner part and located at both sides of the identification code reader respectively.

7. The conveyor mechanism according to claim 6, wherein the shield comprises a mounting bracket and a first mounting hole is provided on the running part, and a mounting part of the mounting bracket is connected with the running part through the first mounting hole.

8. The conveyor mechanism according to claim 5, further comprises a securing member which is connected with the limit switch controller, wherein the limit switch controller is connectable with the conveyor mechanism by means of a connection between the securing member and a securing hole provided on the running part.

9. The conveyor mechanism according to claim 6, wherein a second mounting hole is provided on the running part and the support part is connected with the running part through the second mounting hole.

10. The conveyor mechanism according to claim 8, wherein the shield comprises a mounting bracket and a first mounting hole is provided on the running part, and a mounting part of the mounting bracket is connected with the running part through the first mounting hole.

11. The conveyor mechanism according to claim 8, wherein a second mounting hole is provided on the running part and the support part is connected with the running part through the second mounting hole.

12. The conveyor mechanism according to claim 5, wherein the shield comprises a mounting bracket and a first mounting hole is provided on the running part, and a mounting part of the mounting bracket is connected with the running part through the first mounting hole.

13. The conveyor mechanism according to claim 5, wherein a second mounting hole is provided on the running part and the support part is connected with the running part through the second mounting hole.

14. The conveyor mechanism according to claim 4, wherein the shield comprises a mounting bracket and a first mounting hole is provided on the running part, and a mounting part of the mounting bracket is connected with the running part through the first mounting hole.

15. The conveyor mechanism according to claim 4, wherein a second mounting hole is provided on the running part and the support part is connected with the running part through the second mounting hole.

* * * * *